Sept. 22, 1942.　　　G. P. SCHURZ　　　2,296,540
FUEL METERING DEVICE
Filed May 5, 1939　　　4 Sheets-Sheet 1

G. P. Schurz
INVENTOR.
BY C. A. Snow & Co.
ATTORNEYS.

Sept. 22, 1942.  G. P. SCHURZ  2,296,540
FUEL METERING DEVICE
Filed May 5, 1939  4 Sheets-Sheet 3

G. P. Schurz
INVENTOR.
BY
ATTORNEYS.

Sept. 22, 1942.  G. P. SCHURZ  2,296,540
FUEL METERING DEVICE
Filed May 5, 1939  4 Sheets-Sheet 4
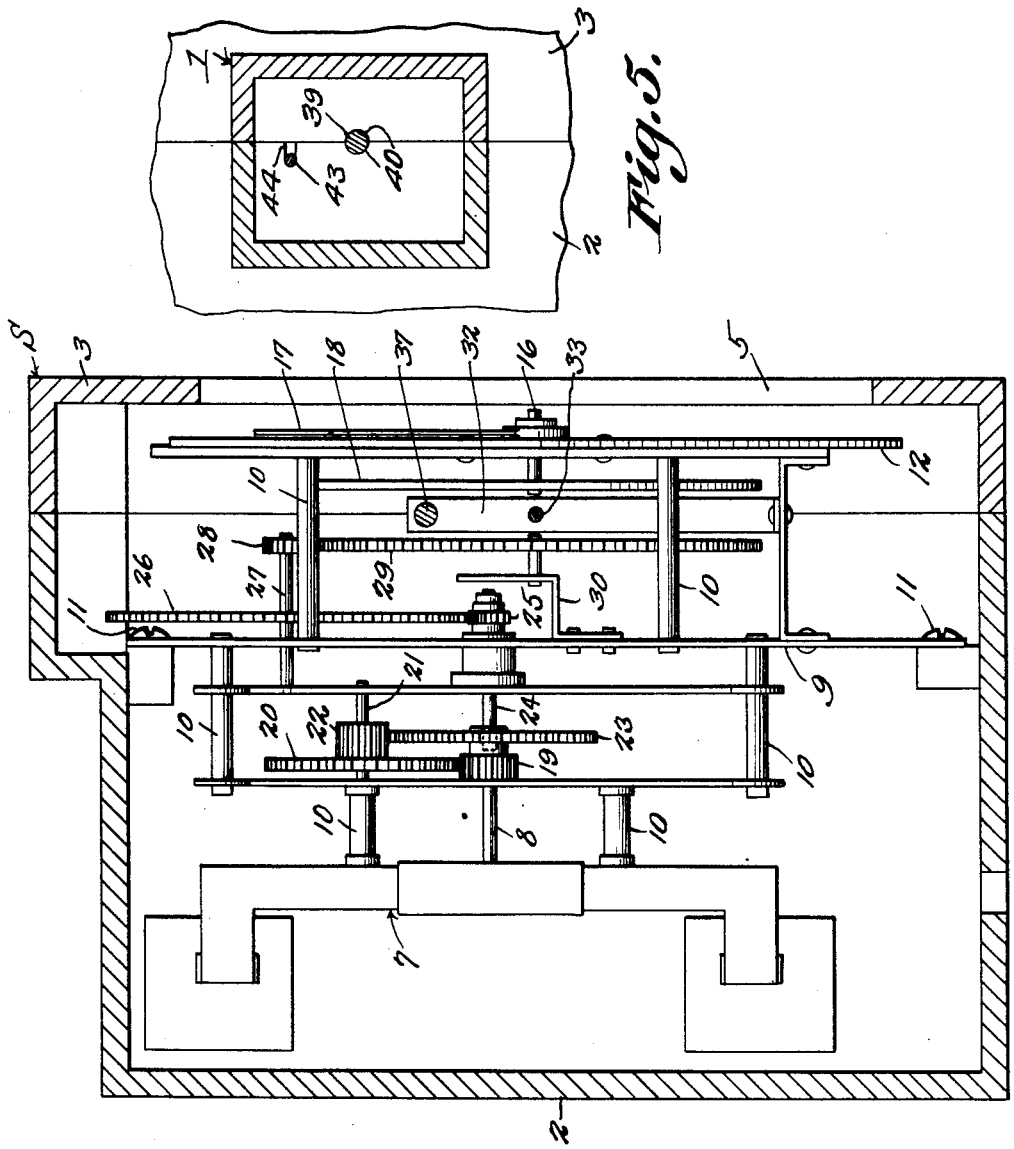
G. P. Schurz
INVENTOR.
BY C A Snow & Co.
ATTORNEYS.

Patented Sept. 22, 1942

2,296,540

UNITED STATES PATENT OFFICE 2,296,540

FUEL METERING DEVICE

Godfrey P. Schurz, Portland, Oreg.

Application May 5, 1939, Serial No. 272,018

3 Claims. (Cl. 73—198)

This invention has among its objects, the provision of a simple but novel means whereby, in an intermittently fired, liquid fuel burner, such as is used in ordinary domestic establishments, the amount of fuel available may be determined readily by inspection, and without sounding the fuel tank, resorting to the use of ullage rods, and similar operations. A further object of the invention is to supply a novel means whereby the time element in the operation of a fuel pump, is made effective to give a reading as to fuel consumed or fuel on hand. The invention aims, further, to provide a machine of the class described which will make allowance for, and take into "consideration," if that word may be used properly in connection with a machine, the peculiarities of any particular installation, such as fuel nozzle discharge and storage tank capacity.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 4 is a section on the line 4—4 of Fig. 3;

Fig. 5 is a section on the line 5—5 of Fig. 2.

Figure 1:
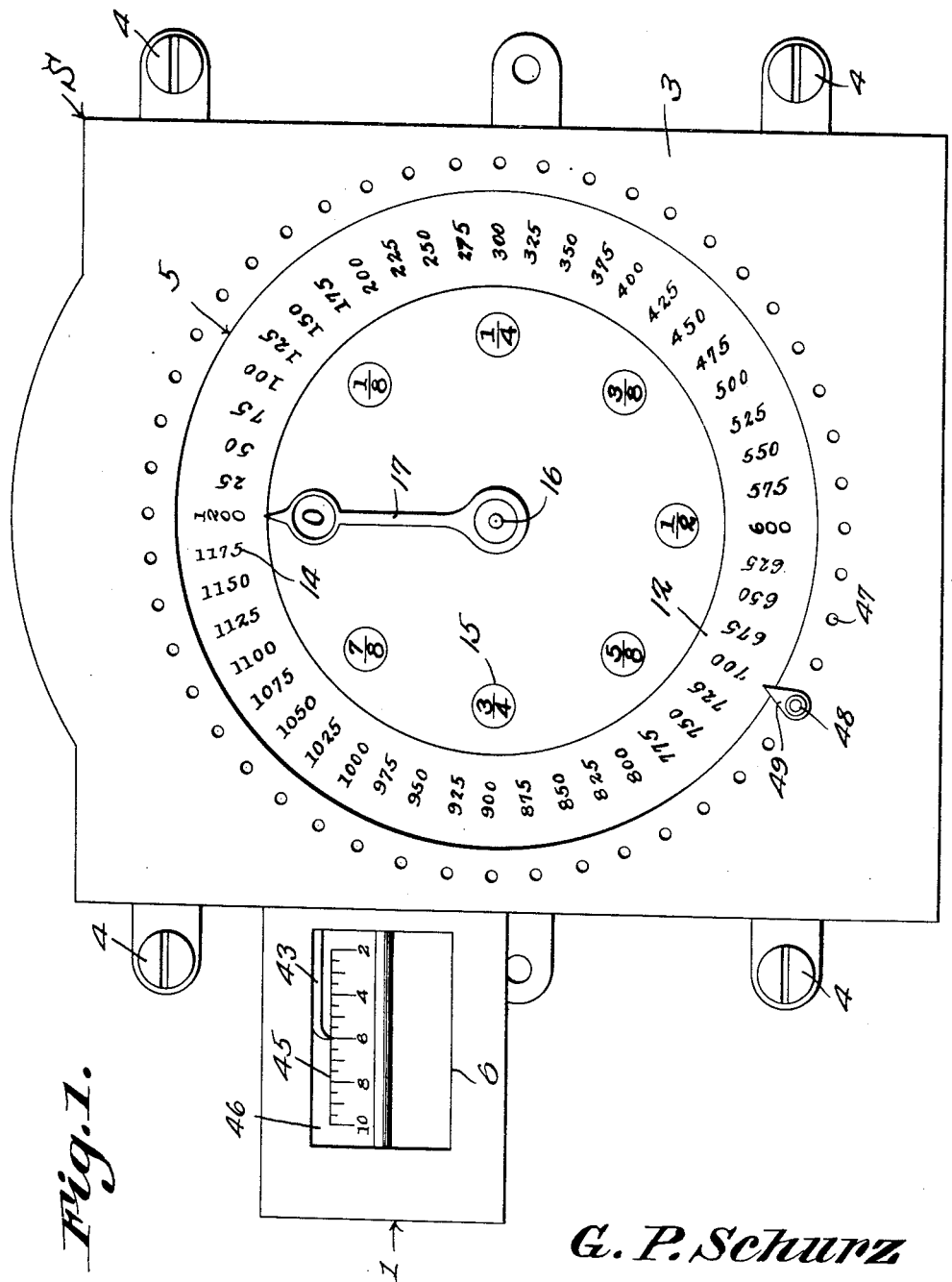
Fig. 1 shows, in front elevation, a device constructed in accordance with the invention.

In carrying out the invention, there is provided a support, preferably in the form of a casing, and designated by the reference letter S. The support S has a lateral extension 1. The support S comprises a box-like body 2 and a closure 3, the parts being held together, detachably, by securing elements 4. The extension 1 is formed partly on the body 2 and partly on the closure 3, as Fig. 3 will make manifest. It can be seen in Fig. 1 that the closure 3 is provided with an opening 5, communicating with the main cavity of the support S, the closure having an opening 6, communicating with the extension 1.

Mounted within the body 2 of the support S is an electrical motor 7, of the self-starting clock type, the hour arbor being marked by the numeral 8. The motor 7 is electrically connected to the fuel feed pump (not shown) of the heating system, to start, stop, and operate in synchronism with the feed pump.

A frame 9 is located within the support S. The frame 9 need not be described in great detail, because it can be constructed in various ways, without jeopardizing the utility of the invention. Spacing posts 10 are used between various parts of the frame 9, and are interposed between the frame and the motor 7. The frame 9 is secured, as indicated at 11, to the body 2 of the support S.

The frame 9 includes a dial 12, visible through the opening 5 in the closure 3 of the support S. The dial 12, as can be seen in Fig. 1, is provided with a circumferential scale 14, calibrated for liquid measure, for instance in gallons. The dial 12 has a second circumferential scale 15, calibrated in fractional parts of the capacity of the container wherein liquid fuel is stored.

A short shaft 16 is mounted for rotation in the dial 12, a hand 17 being secured to the shaft, the hand being adapted to cooperate with the scales 14 and 15 of the dial. A disk 18 is secured to the shaft 16, behind the dial 12. Rotation is imparted to the disk 18, and to the shaft 16, and the hand 17 is caused to move over the dial 12, by a reducing train, and by a mechanism interposed between one member of the train and the disk 18. The reducing train will be traced forwardly from the motor arbor 8, and the interposed mechanism referred to will be described hereinafter.

The motor arbor 8 is supported for rotation in the frame 9, a pinion 19 being secured to the arbor. The pinion 19 meshes with a gear wheel 20, secured to a shaft 21, journaled in the frame. A pinion 22 is secured to the shaft 21, and meshes with a gear wheel 23, secured to a shaft 24, journaled in the frame 9 and in the hub of the pinion 19.

Secured to the shaft 24 is a pinion 25, meshing with a gear wheel 26, carried by a shaft 27, rotatably mounted on the frame. A pinion 28 is secured to the shaft 27, and meshes with a gear wheel 29, supported for rotation on a bracket 30, constituting part of the frame 9, the gear wheel 29 being located immediately behind the disk 18 of the shaft 16, as Fig. 3 will show.

Figure 2:
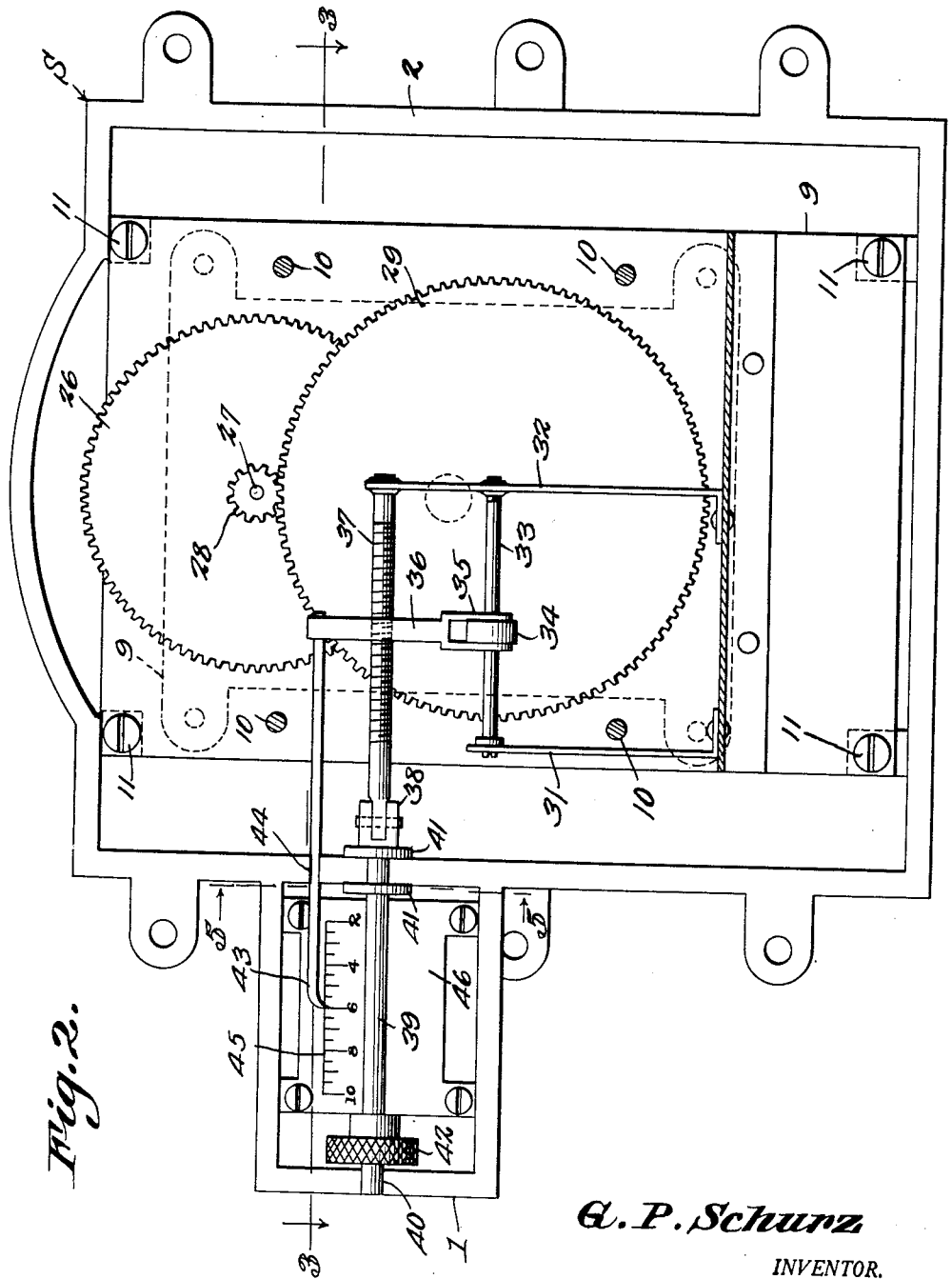
Fig. 2 is a section wherein the closure for the casing has been removed.

As to the mechanism whereby rotation is imparted from the gear wheel 29 to the disk 18 and to the shaft 16, to actuate the hand 17, Fig. 2 shows that the frame 9 comprises vertical posts 31 and 32, the post 32 being of somewhat greater height than the post 31. A guide rod 33 is mounted terminally in the posts 31 and 32, a friction wheel 34 being mounted to turn on the guide rod, the wheel 34 having frictional contact with the disk 18 and with the gear wheel 29. The part 33 is called a guide rod, because the friction wheel 34 can be shifted longitudinally upon it, thereby to change the position of the wheel 34 with respect to the center of rotation of the gear wheel 29 and the disk 18, the speed of rotation imparted to the disk 18 and associate parts, from the gear wheel 29, being regulated accordingly.

As to the means whereby the friction wheel 34 is shifted longitudinally of the guide rod 33, it appears in Fig. 2 that the wheel 34 is received in the fork 35 of a rider 36, the fork of the rider being mounted for reciprocation on the guide rod 33.

Figure 3:
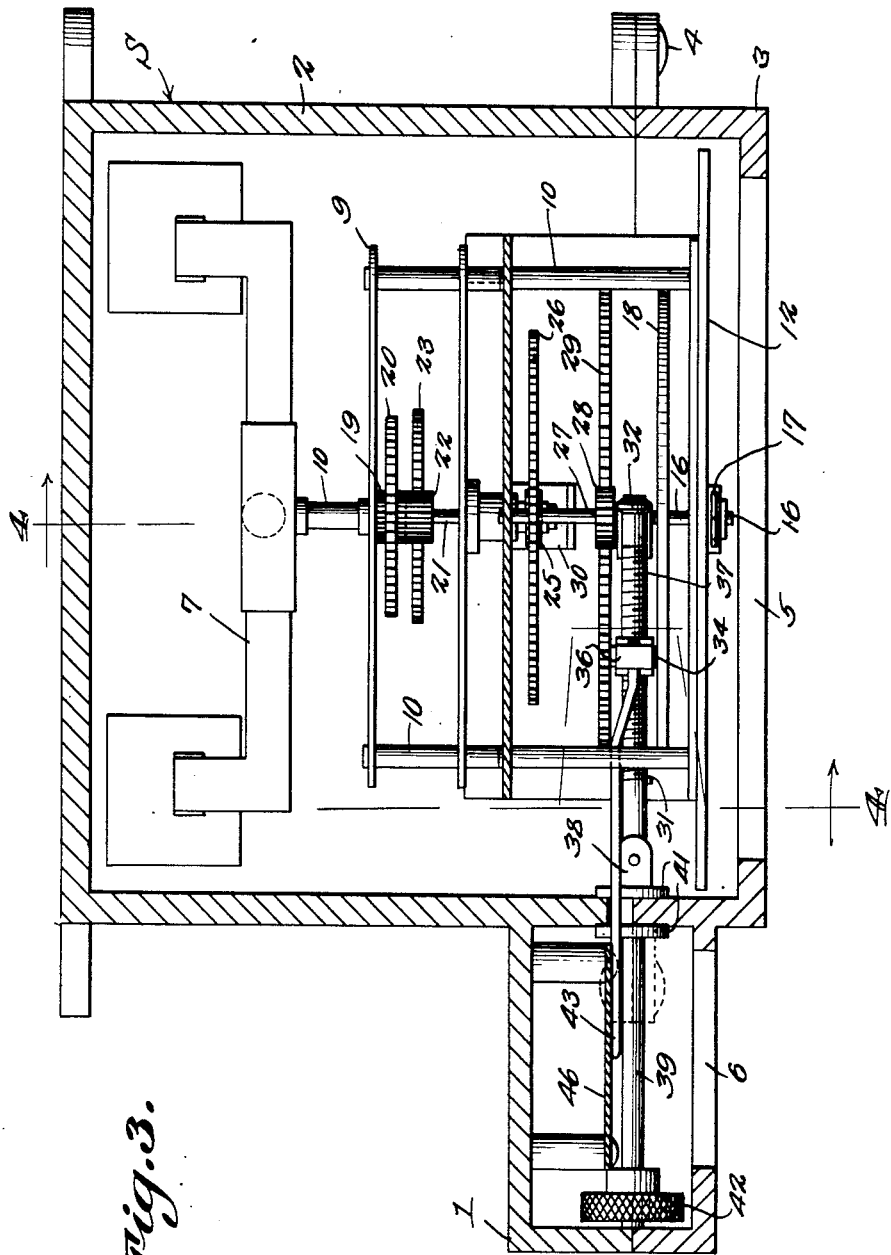
Fig. 3 is a horizontal section taken on the line 3—3 of Fig. 2, parts remaining in elevation.

The position of the rider 36, and therefore the position of the friction wheel 34 with respect to the center of rotation of the gear wheel 29 and the disk 18, is adjusted by means of a feed screw 37, mounted to turn in the post 32, but held against longitudinal movement therein. The feed screw 37 is connected by a coupling 38 to a shaft 39, journaled in mating bearing notches 40 in the constituent parts of the extension 1, as Fig. 5 will disclose. Disks 41 (or equivalent means) on the shaft 39, cooperate with the wall of the support S to hold the shaft 39 against endwise movement. An operating member, such as a knurled finger wheel 42, constitutes means whereby the shaft 39 may be rotated at the will of an operator. An indicator 43, preferably a rod, is attached to the rider 36 and operates in a notch 44 (Fig. 5) in the part of the body 2 that enters into the construction of the extension 1. The indicator 43 is adapted to cooperate with a scale 45 (Fig. 2) on a plate 46, secured within the extension 1. Figure 3 shows that the wheel 42 is housed behind the forward part of the extension 1, and the wheel cannot be reached, and the shaft 39 rotated, without taking off the closure 3. Tampering with this portion of the mechanism, therefore, is made difficult.

It appears in Fig. 1 of the drawings that the closure 3 is provided, about the opening 5, with a circle of seats 47. In any of these seats may be mounted the finger 48 of an oil consumption indicator 49, adapted to cooperate with the scale 14 on the dial 12.

As to gross operation, the motor 7 is operated in synchronism with the fuel supply pump. The motor arbor 8 rotates the disk 18 through a train of parts shown in Fig. 4, and embodying the elements 19—20—22—23—24—25—26—27—28—29, and the friction wheel 34 of Figs. 2 and 3. The disk 18 rotates the shaft 16, and the hand 17 cooperates with the scales 14 and 15 of the dial 12, to indicate the amount of fuel that has been drawn away.

The speed of rotation of the disk 18 and associated parts, considered relatively to the speed of rotation of the gear wheel 29, is regulated by the distance of the friction wheel 34 from the center of rotation of the parts 18 and 29. The position of the friction wheel 34 is regulated, at the will of an operator, by means of the wheel 42, the shaft 39, the coupling 38, the feed screw 37, and the rider 36, the position of the indicator 43 on the scale 45 being noted.

The suction pipe (not shown) of the fuel tank rarely extends to the bottom of a tank, and there is left in the tank, an increment of fuel which cannot be drawn away. After that increment has been determined, the oil consumption indicator 49 is properly located in one of the seats 47 of the closure 3 (Fig. 1). Thereafter, as the hand 17 approaches the indicator 49, the operator is admonished that the supply available for pumping to the burner is diminishing, and should refuel the tank accordingly.

The functioning of the machine depends primarily upon the duration of fuel pump operation. The time that the fuel pipe will operate, before the fuel level in the tank falls to a place where no more fuel can be delivered, depends upon tank capacity, considered relatively to the discharge at the fuel nozzle. By a simple computation, unnecessary to the present disclosure, a constant for any particular installation may be worked out. The operator, by means of the wheel 42 of Fig. 3 and associated parts, shifts the indicator 43 to the proper position on the scale 45, the friction wheel 34 being moved in and out relatively to the center of rotation of the gear wheel 29 and the disk 18, the speed of rotation imparted to the disk 18, the shaft 16 and the hand 17, from the gear wheel 29, being regulated accordingly.

The device may be located at any convenient place where it can be observed readily, and the operator can ascertain at a glance, the amount of liquid fuel on hand, the characteristics of the particular installation being taken care of in the machine itself.

What is claimed is:

1. In a metering and gaging device for fluid fuel burners, a supply indicator comprising rotary driving and driven parts, means for rotating the driving part consonantly with a fuel-supplying means, a fixed guide, a friction wheel engaging the driving and driven parts and shiftable along the guide, toward and away from the center of rotation of the driving and driven parts, a rider shiftable along the guide and engaged with the wheel, to move it along the guide, means under the control of an operator for shifting the rider along the guide, and an index operated by the rider and showing the position of the wheel relatively to the center of rotation of the driving and driven parts.

2. A metering and gaging device for fluid fuel burners, constructed as set forth in claim 1, and further characterized by the fact that the last-specified means embodies a feed screw, held against longitudinal movement, threaded into the rider, and under the control of an operator.

3. In a metering and gaging device for fluid fuel burners, a fuel-supply indicator comprising rotary driving and driven parts, means for rotating the driving part consonantly with fuel-burner feed, a fixed guide, a friction wheel engaging the driving and driven parts and shiftable along the guide, toward and away from the center of rotation of the driving and driven parts, a rider shiftable along the guide and engaged with the wheel, to move it along the guide, a feed screw held against longitudinal movement, threaded into the rider and disposed approximately parallel to the guide, means under the control of an operator for rotating the feed screw, a fixed scale member, and an indicator disposed approximately parallel to the feed screw, the indicator being connected to the rider and cooperating with the scale member.

GODFREY P. SCHURZ.